US009305378B1

(12) United States Patent
Holmes et al.

(10) Patent No.: US 9,305,378 B1
(45) Date of Patent: Apr. 5, 2016

(54) LENSLET, BEAMWALK AND TILT DIVERSITY FOR ANISOPLANATIC IMAGING BY LARGE-APERTURE TELESCOPES

(71) Applicant: The Boeing Company, Chicago, IL (US)

(72) Inventors: Richard B. Holmes, Cameron Park, CA (US); David R. Gerwe, West Hills, CA (US); Paul S. Idell, Thousand Oaks, CA (US); Brandoch Calef, Kihei, HI (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/572,815

(22) Filed: Dec. 17, 2014

(51) Int. Cl.
| | |
|---|---|
| *H04N 5/228* | (2006.01) |
| *G02B 13/16* | (2006.01) |
| *H04N 5/225* | (2006.01) |
| *G02B 27/10* | (2006.01) |
| *G01J 1/20* | (2006.01) |
| *G01C 21/02* | (2006.01) |
| *G01C 21/24* | (2006.01) |
| *G06T 11/00* | (2006.01) |

(52) U.S. Cl.
CPC ............ *G06T 11/003* (2013.01); *H04N 5/2254* (2013.01); *H04N 5/2257* (2013.01)

(58) Field of Classification Search
CPC ........ G02B 26/06; G02B 26/00; G02B 13/14; G02B 27/0012; G02B 27/0025; G02B 27/50; G01J 9/00; H04N 5/238
USPC .......... 348/222.1, 335–369; 250/201.9, 203.1
See application file for complete search history.

(56) References Cited

U.S. PATENT DOCUMENTS

| | | | | | |
|---|---|---|---|---|---|
| 5,416,616 | A | * | 5/1995 | Jenkins ..................... | G02B 5/32 359/10 |
| 5,610,707 | A | * | 3/1997 | Duncan ..................... | G01J 9/00 250/201.9 |
| 5,978,053 | A | * | 11/1999 | Giles ..................... | G01B 11/272 250/201.3 |
| 6,570,143 | B1 | * | 5/2003 | Neil .......................... | G01J 9/00 250/201.9 |
| 7,268,937 | B1 | * | 9/2007 | Andersen .................. | G01J 9/00 16/19 |
| 7,333,215 | B2 | | 2/2008 | Smith | |
| 7,343,098 | B2 | | 3/2008 | Gerwe et al. | |
| 7,397,018 | B1 | * | 7/2008 | Pham ..................... | G02B 26/06 250/201.1 |
| 7,515,767 | B2 | * | 4/2009 | Miller .................. | G06K 9/0063 382/191 |

(Continued)

OTHER PUBLICATIONS van Eekeren et al., "Patch-Based Local Turbulence Compensation in Anisoplanatic Conditions", Infrared Imaging Systems: Design, Analysis, Modeling, and Testing XXIII, edited by Hoist et al., Proc. of SPIE, vol. 8355 (2012).

(Continued)

*Primary Examiner* — Chia-Wei A Chen
(74) *Attorney, Agent, or Firm* — Ostrager Chong Flaherty & Broitman P.C.

(57) ABSTRACT

Systems and methods which combine standard image reconstruction and beam-control techniques with tomographic estimation of three-dimensional atmospheric turbulence to enable high-quality anisoplanatic imaging of distant objects at long range through the atmosphere over an extended field-of-view using a large aperture. More specifically, the systems and methods combine the concepts of atmospheric tomography, forward-model image reconstruction and tip, tilt, beamwalk, and focus control techniques to produce image reconstructions of high quality for large objects that move rapidly as viewed by large apertures in weak or strong extended atmospheric turbulence.

20 Claims, 4 Drawing Sheets

(56) References Cited

U.S. PATENT DOCUMENTS

| | | | | |
|---|---|---|---|---|
| 8,237,835 | B1* | 8/2012 | Muller | A61B 3/1025 250/201.9 |
| 9,063,002 | B2* | 6/2015 | Wallace | G01J 9/02 |
| 2004/0099787 | A1 | 5/2004 | Dolne et al. | |
| 2005/0080469 | A1* | 4/2005 | Larson | A61N 7/02 607/101 |
| 2005/0149008 | A1* | 7/2005 | Larson | A61N 7/02 606/27 |
| 2006/0198404 | A1* | 9/2006 | Henrichs | H01S 5/18391 373/29.02 |
| 2008/0273781 | A1* | 11/2008 | Manduca | G06T 7/0081 382/131 |
| 2011/0109962 | A1* | 5/2011 | Cui | A61B 5/0059 359/385 |
| 2011/0137126 | A1* | 6/2011 | French | A61B 1/00165 600/178 |
| 2014/0267674 | A1 | 9/2014 | Mertz et al. | |
| 2015/0120196 | A1* | 4/2015 | Li | G01V 1/306 702/13 |

OTHER PUBLICATIONS

Britton et al., "The Anisoplanatic Point-Spread Function in Adaptive Optics", Publications of the Astronomical Society of the Pacific, vol. 118, Jun. 2006, pp. 885-900.

Calef et al., "Improving imaging through turbulence via aperture partitioning", Visual Information Processing XIX, edited by Rahman et al., Proc. of SPIE, vol. 7701 (2010).

Campbell et al., "Atmospheric Turbulence and Its Influence on Adaptive Optics", Mar. 23, 2009, pp. 1-10.

Calef et al., "Improving large-telescope speckle imaging via aperture partitioning", Proc. SPIE, vol. 7701 (2010).

Fraser et al., "Anisoplanatic Image Restoration at ADFA," Proc. VIIth Digital Image Computing: Techniques and Applications, edited by Sun et al., Sydney, Australia, Dec. 10-12, 2003.

Gerwe et al., "Comparison of Maximum-Likelihood Image and Wavefront Reconstruction Using Conventional Image, Phase Diversity, and Lenslet Diversity Data," Unconventional Imaging II, edited by Gamiz et al., Proc. of SPIE, vol. 6307 (2006).

Gerwe et al., "Diversity Image Restoration with Dynamically Changing Magnification, Rotation and Translation", AMOS Techn. Conf. Proc. (2007).

Jefferies et al., "High-resolution through strong atmospheric turbulence and over wide fields-of-view", Proc. SPIE, vol. 8890 (2013).

Muller et al., "Anisoplanatism Effects in Shack-Hartman Wave Front Sensing with Laser Guide Stars on the ELTs", 1st AO4ELT Conference—Adaptive Optics for Extremely Large Telescopes. published online Feb. 24, 2010.

Gonslaves et al., "Nonisoplanatic imaging by phase diversity", Optics Letters, vol. 19, Issue 7 (1994). pp. 493-495.

Paxman et al., "Phase-diversity correction of turbulence-induced space-variant blur", Optics Letters, vol. 19, Issue 16 (1994), pp. 1231-1233.

* cited by examiner

LENSLET, BEAMWALK AND TILT DIVERSITY FOR ANISOPLANATIC IMAGING BY LARGE-APERTURE TELESCOPES

BACKGROUND

This disclosure generally relates to systems and methods for imaging objects at long range through the atmosphere, and in particular air-air surveillance and air to space surveillance. In particular, this disclosure relates to systems and methods for compensating for the effects of atmospheric turbulence in images of objects at long range, including stars, orbiting objects, missiles, and airplanes.

When light from a star or another astronomical object enters the Earth's atmosphere, atmospheric turbulence (introduced, for example, by different temperature layers and different wind speeds interacting) can distort and move the image in various ways. Images produced by any telescope larger than 10 cm in diameter are blurred by these distortions. The blur changes rapidly, so that in long-exposure images the higher spatial frequencies are wiped out. One way of dealing with this problem is to correct the wavefront using real-time adaptive optics (AO). A complementary approach is to use speckle imaging techniques, in which an image is reconstructed from many short exposures.

An AO system may comprise a wavefront sensor (WFS) which takes some of the astronomical light, a deformable mirror that lies in the optical path, and a computer that receives input from the detector and controls the surface of the deformable mirror. Alternatively the deformable mirror could be substituted by other types of devices that provide a capability to adjust the phase of an optical beam as a function of spatial position across the beam and as a function of time, another example being a liquid crystal spatial light modulator. The AO system relies on the wavefront sensor to measure turbulence-induced perturbations on the wavefront. These measurements can be used to improve the performance of the imaging system by reducing the effect of wavefront distortions: it aims at correcting the deformations of an incoming wavefront by rapidly deforming a mirror in order to compensate for the distortion.

The simplest form of adaptive optics is tip-tilt correction, which corresponds to correction of the tilts of the wavefront in two dimensions (equivalent to correction of the position offsets for the image). Rapid optical tilts in both X and Y directions are termed jitter. Jitter can arise from rapidly varying three-dimensional (3-D) refraction in aerodynamic flow fields. Jitter may be compensated in an AO system using a flat steering mirror mounted on a dynamic two-axis mount that allows small, rapid, computer-controlled changes in the mirror X and Y angles. By reflecting light from a computer-driven flat steering mirror, an image or laser beam can be stabilized. Image blurring due to motion and far-field laser beam jitter are reduced if not eliminated.

Adaptive optics is inherently an isoplanatic technology, i.e., it assumes that the turbulence effect is constant over an angle termed the "isoplanatic angle". In fact, the wavefront distortion due to turbulence is spatially varying due to anisoplanatic conditions, while the isoplanatic angle varies with atmospheric conditions. Adaptive optical correction of an extended region consisting of multiple isoplanatic patches (i.e., temporally coherent paths) requires significant added complexity in the AO system.

It would be advantageous to provide astronomical instrumentation that can perform high-quality anisoplanatic imaging over an extended field-of-view using a large aperture without the added complexity of AO systems.

SUMMARY

The approach disclosed herein combines standard image reconstruction techniques with tomographic estimation of three-dimensional atmospheric turbulence to enable high-quality anisoplanatic imaging over an extended field-of-view using a large aperture. More specifically, the systems and methods disclosed in detail below combine the concepts of atmospheric tomography, forward-model image reconstruction and diversity techniques to produce image reconstructions of high quality for large objects that move rapidly as viewed by apertures larger than about 10 cm in weak or strong extended turbulence.

With atmospheric phase tomography used in adaptive optics, collection of light at the wavefront sensor over multiple frames will sample multiple paths through the atmosphere and enable estimation of the volume of atmospheric turbulence. The same can be true for image reconstruction using a forward model to post-process measured data, provided that the forward model is formulated correctly. The measured data depends functionally on some underlying parameters, such as a pristine object profile. A forward model technique is an algorithm that estimates those underlying parameters by matching the measurements to the forward model prediction.

The approach proposed herein is directed towards imaging of distant objects (including objects in Earth orbit), is readily implementable, and uses tilt/beamwalk diversity to create shifts in both the pupil plane and image plane that enable phase estimation across the full aperture in great detail. This approach enables reconstruction of images much larger than an isoplanatic patch angle, because it estimates the entire volume of aberrations in the atmosphere between the object and the receiver. It uses active beam tilt, beam walk, and focus control to obtain diversity on demand, rather than reliance on turbulence layer movement. Using a receiver sensor (e.g., a telescope) constructed in accordance with the teachings herein, angular regions as large as 100 microradians may be imageable, and for apertures as large as 100×Fried's $r_0$.

The embodiments of systems and methods for anisoplanatic imaging disclosed in detail below may employ actuation of two fast steering mirrors placed in front of a beam splitter and actuation of a lenslet array and/or an imaging lens after beam splitting. The lenslet array is located in front of a WFS camera and the imaging lens is disposed in front of a conventional focal plane array. It is desirable for the imaging camera and the WFS camera to sample their respective images at a density of points at least as fine as the Nyquist rate. In angular terms, this is $\lambda/2D$, where $\lambda$ is the mean wavelength of operation and for the imaging camera, D is the aperture diameter of its optical pupil. For the WFS camera, D is the subaperture diameter. However, this is not a necessity; the system could use cameras with coarser sampling than Nyquist, possibly with some degradation in performance. In some embodiments, these features are combined with object motion, enabling multi-path sampling of the atmospheric refractive index volume.

One aspect of the subject matter disclosed in detail below is a method of anisoplanatic imaging of objects at long range through the atmosphere comprising the following steps: (a) receiving light from a distant object at a pupil; (b) collecting respective portions of the received light toward an imager camera and a lenslet array of a wavefront sensor using diversity techniques to form successive focal plane images in the imager camera and successive wavefront sensor images in a camera of the wavefront sensor; (c) using a forward model technique to jointly update an atmospheric phase volume estimate for each wavefront sensor image and update a point spread function estimate; (d) reconstructing an image of the distant object based on the updated point spread function and atmospheric phase volume estimates; and (e) iteratively performing steps (a) through (d) until atmospheric phase aberrations in the reconstructed image are minimized, wherein the diversity techniques are controlled by a computer system, and processes (c) and (d) are performed by the computer system. In accordance with some embodiments, the diversity techniques comprise shifting an image of the pupil on the wavefront sensor camera.

Another aspect of the disclosed subject matter is a method of anisoplanatic imaging of objects at long range through the atmosphere comprising: (a) receiving light from a distant object through an aperture of a receiver sensor; (b) splitting the received light into a first beam directed toward an imager camera and a second beam directed toward a lenslet array of a wavefront sensor; (c) shifting an image of the pupil on a focal plane array of a camera of the wavefront sensor; (d) estimating atmospheric phase aberrations in a three-dimensional volume within a field of view of the receiver sensor for a multiplicity of subapertures for each image output by the wavefront sensor camera; and (e) reconstructing an anisoplanatic image of the distant object using the estimated atmospheric phase aberrations, wherein operation (c) is controlled by a computer system and processes (d) and (e) are performed by the computer system. This method may further comprise one or more of the following operations: (i) measuring different overlapping light pipes in multiple directions, wherein process (d) comprises solving multiple independent sums of phases over turbulence layers using linear techniques to estimate the atmospheric phase aberrations in the three-dimensional volume; (ii) applying beamwalk diversity to cause overlap of subaperture images in successive images acquired by the wavefront sensor camera, wherein process (d) comprises stitching the subaperture wavefronts together using a forward model technique; (iii) applying focus diversity by adjusting the focus of the WFS such as by moving the lenslet array or the camera along the optical axis of the wavefront sensor, wherein operation (e) comprises anisoplanatic reconstruction of each subaperture image; (iv) applying focus diversity by adjusting the focus of the imaging system such as by moving an imaging lens or the camera of the imaging system along the optical axis of the imager, wherein operation (d) comprises estimating the phase of a distant object extending over multiple isoplanatic patches; and (v) breaking up the aperture into a regular array of subapertures to form a multiplicity of subaperture images from the image output by the wavefront sensor camera.

A further aspect of the subject matter disclosed in detail below is a system for imaging of objects at long range through the atmosphere, comprising: a receiver sensor comprising an aperture; a first fast steering mirror located at a pupil plane and receiving light that has passed through the aperture; a second fast steering mirror located at a distance from the pupil plane and receiving light reflected from the first fast steering mirror; a beam splitter arranged to receive light reflected from the second fast steering mirror, the beam splitter splitting incoming light into first and second light beams; a lenslet array arranged to receive the first light beam; a wavefront sensor camera arranged to receive light that has passed through the lenslet array; an imager camera arranged to receive the second light beam; and a computer system programmed to perform the following operations: (a) controlling actuation of the first and second fast steering mirrors and/or the lenslet array to cause a shift of a pupil image on the wavefront sensor camera; (b) updating a three-dimensional atmospheric phase volume estimate based on images captured by the imager camera or subaperture images captured by the wavefront sensor camera; (c) updating a point spread function estimate based on images captured by the imager camera or subaperture images captured by the wavefront sensor camera; and (d) reconstructing an anisoplanatic image of the object using the updated point spread function and atmospheric phase volume estimates. The computer system controls actuation of movement of the lenslet array in directions parallel and perpendicular to an optical axis of the wavefront sensor camera. The computer system may be further programmed to control actuation of the first and second fast steering mirrors to provide beamwalk diversity to cause shifts of the subaperture images in successive samples captured by the wavefront sensor camera, and operation (c) comprises stitching phase data together using a forward model technique. Operations (b) through (d) are iteratively performed using a forward model technique until atmospheric phase aberrations in the reconstructed image are minimized. The forward model can include penalty functions for atmospheric turbulence that is not consistent with expected turbulence statistics and correlations in position or time.

Other aspects of systems and methods for anisoplanatic imaging of distant objects through the atmosphere are disclosed and claimed below.

BRIEF DESCRIPTION OF THE DRAWINGS

Reference will hereinafter be made to the drawings in which similar elements in different drawings bear the same reference numerals.

DETAILED DESCRIPTION

Various embodiments of systems and methods for anisoplanatic imaging of distant objects, including Earth-orbiting objects, with compensation for atmospheric turbulence-induced distortions will be described below in detail for the purpose of illustration. Those anisoplanatic imaging systems combine atmospheric tomography, forward-model image reconstruction and diversity techniques to produce image reconstructions of high quality for large objects that move rapidly as viewed by large apertures in weak or strong extended turbulence.

Figure 1:
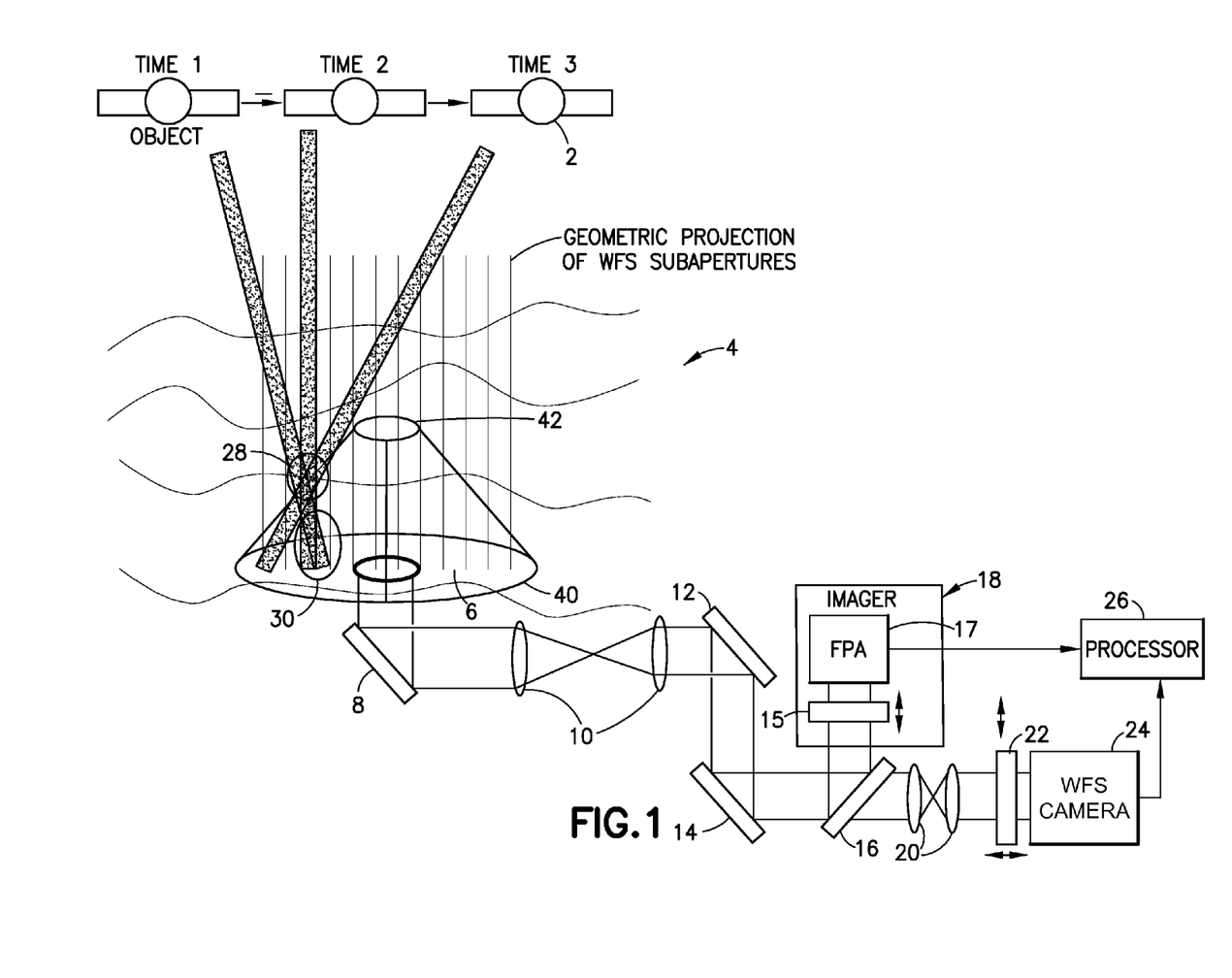
FIG. 1 is a diagram representing components of a system for anisoplanatic imaging of an object at long range through the atmosphere in accordance with one embodiment. The object is shown at three different positions over time. Circled regions indicate overlaps of multiple paths of light from the object received by the telescope at different times that enable estimation of the 3-D atmospheric turbulence profile.

Some components of a first illustrative embodiment of an anisoplanatic imaging system are schematically depicted in FIG. 1, which shows a stationary atmosphere and an object moving in the field of view (FOV) of a telescope. (An alternative representation of the sensing geometry is that of a translating atmosphere and an object at a fixed position in the FOV of the slewing telescope, e.g., as is the case when tracking a low-Earth-orbit (LEO) satellite.) An object 2 of interest, being viewed by a telescope, is shown in three different positions at Time 1, Time 2, and Time 3 respectively. The speckled bars in FIG. 1 also depicts respective "pipes" of light of varying phase originating from the object 2 at Time 1, Time 2, and Time 3. [As used herein, the term "pipe" means a pipe-shaped volume of space along a line of sight to the object. The light from the object may have phase aberrations due to atmospheric turbulence in the pipe.] In the example depicted in FIG. 1, the phase pipes overlap (at different times) in two regions 28 and 30 indicated by respective ellipses. Light within the field of view is captured by the telescope and used to produce an image of the object 2. However, in the absence of compensation for the effects of intervening turbulence 4 (indicated by wavy lines in FIG. 1), that image could be blurred or otherwise distorted.

A system and method for compensating for turbulence-induced phase aberrations in light from a source object will now be described with reference to FIG. 1, which includes a block diagram showing components of an anisoplanatic imaging system. The telescope comprises a primary mirror 40, defining a receive aperture or pupil 6, and a secondary mirror 42. Incident light on the primary mirror 40 is reflected toward the secondary mirror 42, which in turn reflects impinging light toward a fold flat mirror 8. The light from the secondary mirror 42 is in turn reflected by the fold flat mirror 8 toward a first relay lens system 10. Exiting the first relay lens system 10, the light impinges on the first fast steering mirror 12, forming an image of the pupil which is coincident with the first fast steering mirror 12 The first fast steering mirror 12 reflects this incident light toward a second fast steering mirror 14. The second fast steering mirror 14 is at a distance Δz from the image of the pupil. The image of the pupil at the second fast steering mirror 14 is blurred.

In accordance with the embodiment depicted in FIG. 1, the second fast steering mirror 14 is oriented such that light reflected therefrom impinges on a beam splitter 16 (e.g., a dichroic or intensity beam splitter). The light is split in two by the beam splitter 16: some of the light is reflected toward an imaging lens 15 of an imager camera 18; and other light is transmitted toward a second relay lens system 20. Imager camera 18 further comprises a focal-plane array 17 which receives light from that has passed through the imaging lens 15. The focal plane array 17 converts the focal plane image into an electrical image signal that can be read out and processed and/or stored by a processor 26. Desirably the focal plane is sampled at the Nyquist frequency, although this is not a necessity (previously described).

Still referring to FIG. 1, the light passed through the second relay lens system 20 impinges on a lenslet array 22 of a Shack-Hartmann or other type of wavefront sensor, which further comprises a WFS camera 24. The lenslet array 22 comprises a set of lenslets (not shown) arrayed at a pupil plane. Each lenslet is a separate small lens having the same focal length, the lenslets being rectilinearly or regularly distributed in the pupil plane. The lenslets serve to break up the pupil 6 to form the subapertures represented by parallel vertical lines in FIG. 1. Each lenslet is focused onto a focal plane array (e.g., a CCD array) of the WFS camera 24. The focal plane array (not shown in FIG. 1) of the WFS camera 24 converts the multiplicity of subaperture images corresponding to the multiplicity of lenslets into electrical image signals that can be read out and processed and/or stored by the processor 26. Using a Shack-Hartmann wavefront sensor, which measures tilts, enables measurement of the phase and amplitude of the light field.

In accordance with one wavefront reconstruction implementation, the processor 26 can be programmed to calculate the local tilt of the wavefront across each lenslet from the position of the respective focal spot on the focal plane array of the WFS camera 24. Any phase aberration can be approximated by a set of discrete tilts. By sampling the light passing through the lenslets, the tilts can be measured and any wavefront phase aberrations can be approximated by the processor 26.

During operation of the telescope, fast steering mirrors 12 and 14, lenslet array 22, and (optionally) imaging lens 15 of imager camera 18 are actuated. The X and Y angles of the first fast steering mirror 12 can be controlled by the processor 26 (or a separate computer or processor) to achieve tilt diversity. The angles of the first and second fast steering mirrors 12 and 14 can be controlled by the processor 26 to provide beamwalk diversity. (As used herein, "beamwalk" means shifting the pupil image on the wavefront sensor.) In addition, the lenslet array 22 is movable back and forth along the optical axis of WFS camera 24, as indicated by a double-headed arrow in FIG. 1, to achieve focus (i.e., lenslet) diversity. The lenslet array 22 is also movable back and forth along axes orthogonal to the optical axis of WFS camera 24 (not indicated in FIG. 1), to provide beamwalk diversity. Optionally, the imaging lens 15 is also movable back and forth along the optical axis of imager camera 18 to achieve focus diversity. The processor is programmed to control the fast steering mirrors, the lenslet array and the imaging lens to adjust the tilt, focus and beamwalk during the iterative process of image acquisition and image reconstruction.

In the system depicted in FIG. 1, tilt, focus and beamwalk diversity combined with object motion enable multi-path sampling of the atmospheric refractive index volume. This multi-path sampling enables the processor 26 to remove turbulence-induced distortions from a reconstructed object image using tomographic estimation of 3-D atmospheric turbulence. The operations performed by the processor 26 will be described in more detail later with reference to FIG. 4.

The motion of a source object 2 of interest will result in phase samples of the atmosphere at varying angles as shown in FIG. 1. The WFS camera 24 can sample the light from the object 2, sampling the atmosphere in different directions. Phase is measured along "pipes" represented by speckled bars in FIG. 1; locations where the pipes intersect are indicated by ellipses in FIG. 1. Light emanating from the same object point at different times will encounter different volumes of turbulence that will induce differing phase aberrations and yield point spread functions having different shapes. The measurement of different, overlapping pipes in regions 28 and 30 in multiple directions creates multiple independent sums of phases over turbulence layers that can be solved using linear techniques to estimate the 3-D atmospheric phase volume.

The addition of beamwalk diversity (provided by the second fast steering mirror 14 and/or transverse displacement of the lenslet array 22) enables overlap of the subapertures to "stitch" together the subaperture reconstructions in processor 26. As shown in FIG. 1, the fast steering mirror 14 is not located at an image of the pupil, and by adjusting its angle (and compensating its angle with fast steering mirror 12), the image of the pupil can be shifted at will on the WFS camera 24. This causes overlap of the subapertures in successive WFS samples, allowing the processor 26 to stitch phase information together using well-known forward model image and phase reconstruction techniques. Beamwalk also provides an ability to measure the wavefront tilt at a spatially denser set of sample positions. For example, translating the beam across the lenslet array by one half a lenslet width, provides a new set of measurements at sample points half-way between those from the earlier position.

The addition of tilt diversity (provided by the first fast steering mirror 12) enables fine sampling of the focal planes to enable super-resolution. Adjustment of fast steering mirror 12 only, at an image of the pupil, results in shifts of the focal plane images on the WFS camera 24. Changes in tilt will adjust the alignment of each lenslet beam onto the detector array. Making measurements at a set of different tilts provides a collectively denser set of samples than a single measurement. This enables fine-sampling of the subaperture images, which can result in super-resolution of the images within the subapertures. This can be accomplished using any one of a number of techniques. The high-resolution images of each focused lenslet beam support recovery of not just the tip and tilt of the beam's wavefront profile over the respective lenslet but higher order structure, such as focus, astigmatism, coma, and more complicated profiles.

An additional degree of freedom for providing focus diversity involves motion of the lenslet array 22 along the optical axis of the WFS camera 24. Such motion enables more direct anisoplanatic reconstruction of the image in each subaperture. This focus diversity approach may also be applied to the focal plane array of the imager 18 to estimate the phase for an object extending over multiple isoplanatic patches.

Figure 2:
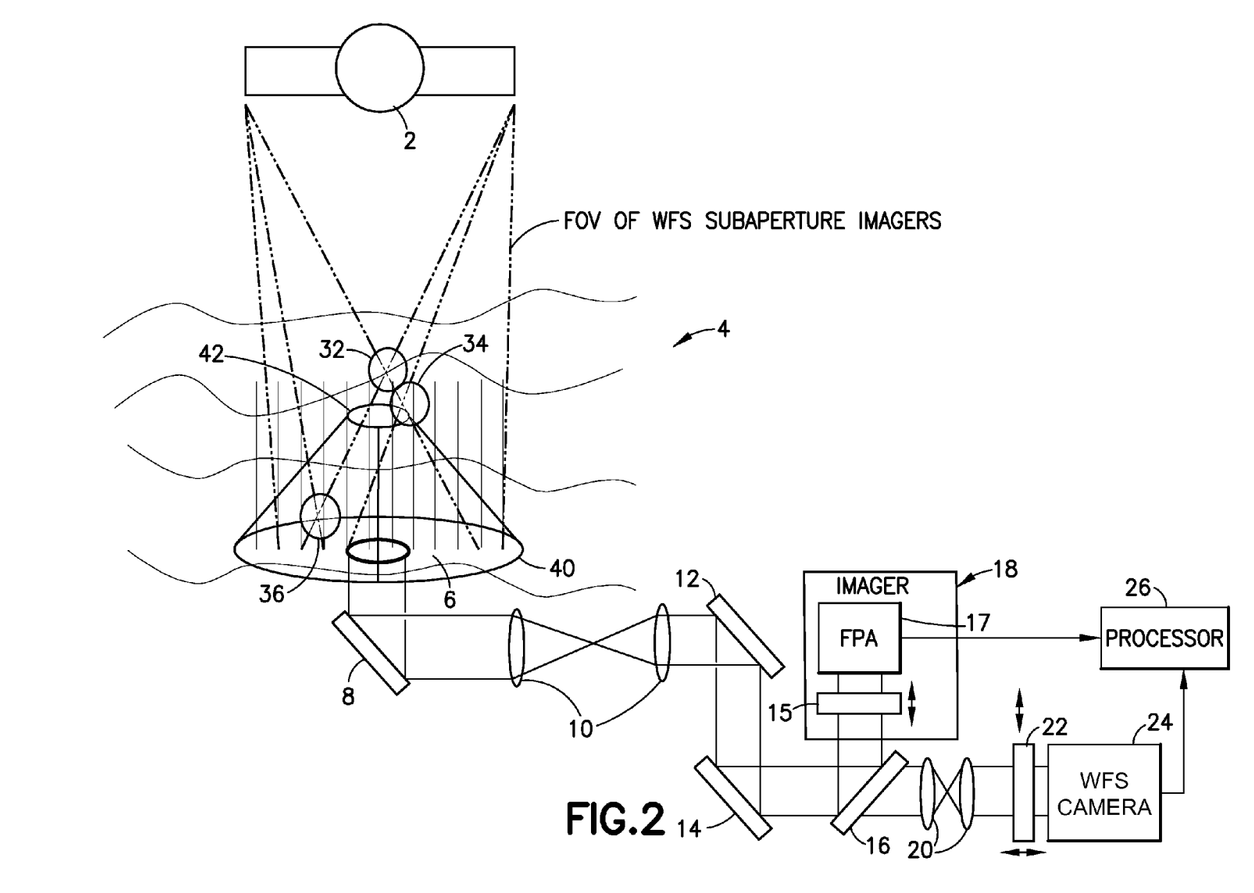
FIG. 2 is a diagram representing components of a system for anisoplanatic imaging of objects at long range through the atmosphere in accordance with an alternative embodiment. Circled regions indicate overlaps of multiple paths of light concurrently received from the object that enable estimation of the 3-D atmospheric turbulence profile.

The focus-diversity alternative provides a second path to large-aperture anisoplanatic imaging, when used with a Shack-Hartmann sensor (i.e., lenslet array 22 and WFS camera 24), as shown in FIG. 2. To avoid clutter in the drawing, the phase pipes are represented in FIG. 2 as chain dash-dot lines instead of as speckled bars. Light emanating from the different object points at the same time will encounter different volumes of turbulence that will induce differing phase aberrations and yield point spread functions having different shapes. In the example depicted in FIG. 2, some phase pipes overlap in three regions 32, 34 and 36 indicated by respective ellipses. The differing point spread functions from different points on the object can be used to reconstruct wavefronts from those different object points. These wavefronts can be unwrapped from their modulo $2\pi$ phase to give phase aberrations, which in turn correspond to integrated phases along the phase pipes exemplified in FIG. 2. These integrated phases, along with their intersections as exemplified in regions 32, 34, and 36, can be used to solve for the 3-D volume of phase as in the embodiment depicted in FIG. 1. Light within the field of view of the WFS is captured by the telescope and used to produce a multiplicity of subaperture images corresponding to the respective lenslets making up the lenslet array 22. The measurement of different, overlapping pipes, such as the intersecting pipes in regions 32, 34 and 36, using the point-spread-function approach in this alternative, creates multiple independent sums of phases over turbulence layers that can be solved using linear techniques to estimate the 3-D phase volume. The approach depicted in FIG. 2 might provide such images in only two frames of data, and hence is one possible path to low-latency anisoplanatic imagery for larger objects.

Figure 3:
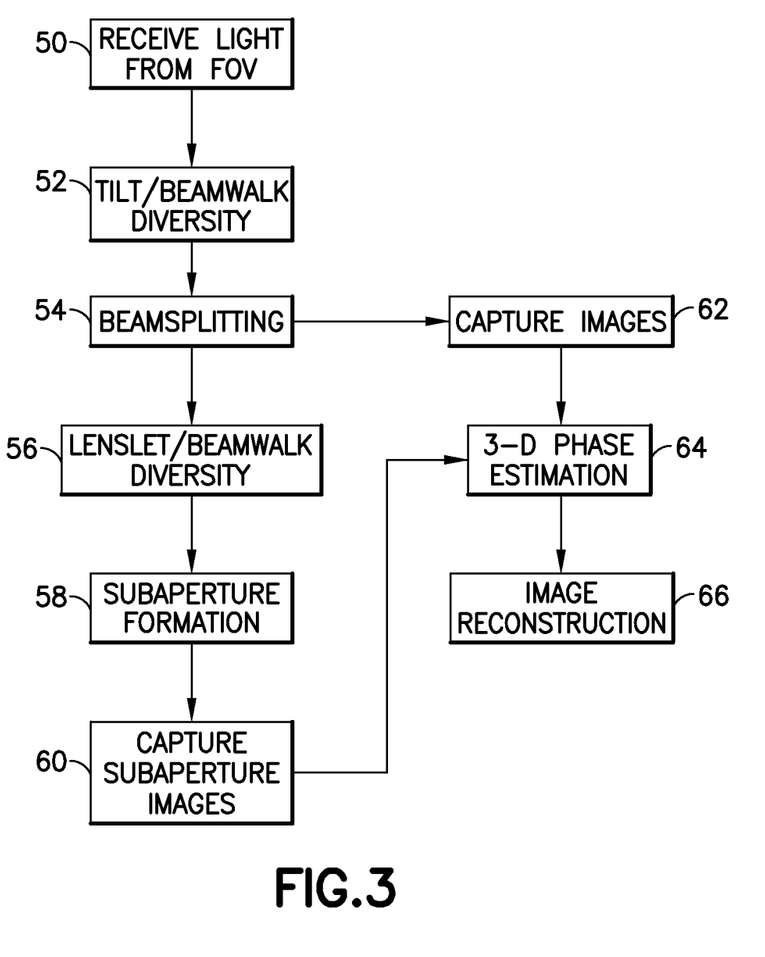
FIG. 3 is a flowchart showing steps of a process for anisoplanatic imaging in accordance with one embodiment, including operations performed by a processor that receives focal plane and WFS images and control the diversity applied to the images.

FIG. 3 is a flowchart showing steps of a process for anisoplanatic imaging in accordance with one embodiment. While pointing at an Earth-orbiting object, a large-aperture telescope receives light within its field of view (FOV) (step 50). The light is formed into a beam by the aperture (i.e., pupil) of the telescope, which beam is then subjected to diverse tilting and walking by actuation of the fast steering mirrors (step 52). Actuation of the fast steering mirrors is controlled by a processor or other computer system. After passing through the fast steering mirrors, the light is split in two (step 54). The light reflected by the beam splitter is directed onto the focal plane of an imager camera, which captures successive images by converting photons into electrical charges (step 62). The light which passes through the beam splitter is next passed through a lenslet array that is actuated to adopt diverse axial and lateral positions to provide lenslet and beamwalk diversity on demand (step 56). Actuation of the lenslet array is controlled by the processor or other computer system. The lenslet array also has the effect of breaking up the aperture into a regular array of subapertures (step 58). Each lenslet focuses light onto a focal plane of a WFS camera. The WFS camera captures a multiplicity of subaperture images by converting photons into electric charges (step 60). The captured images and subaperture images are sent to the processor or other computer system, which uses this image data to estimate the phase aberrations due to atmospheric turbulence (step 64). The processor or other computer system uses those phase estimates to reconstruct an image of the object having reduced blurring (step 66).

The above-described tilt, beamwalk and focus diversity eliminates uncontrolled diversity involving motion of the turbulence layers. Such uncontrolled diversity typically requires estimation of extra nuisance parameters associated with the random variations in collection conditions, i.e., variations in the wind.

Figure 4:
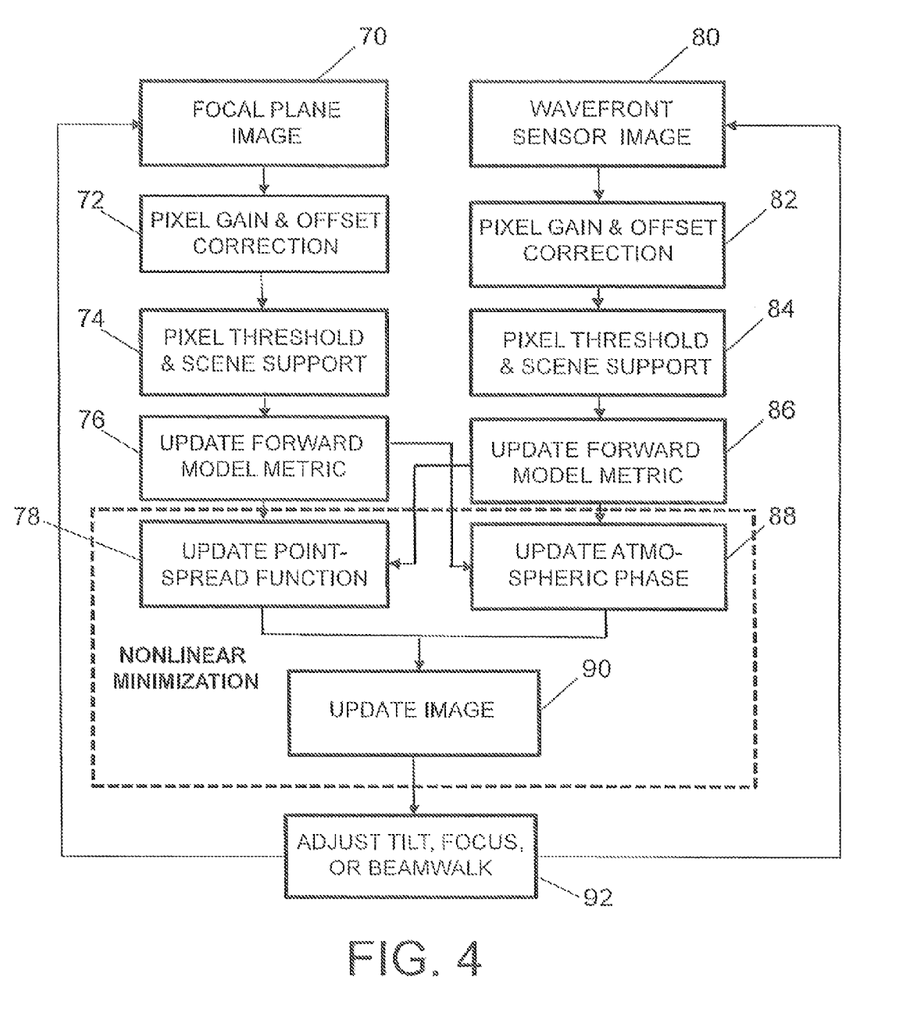
FIG. 4 is another flowchart showing in more detail the operations performed by the post-processor.

As depicted in FIG. 4, the processor continually receives successive focal plane images 70. Each focal plane image 70 is corrected for pixel gain and offset (operations 72) to provide a more uniform image. This correction scheme adjusts the signal response of every pixel in the image based on two calibration points—one with zero signal (the offset) and the other that is typically around 50% of saturation (to calculate the gain). The pixel's gain is how the amount of signal output by the detector varies as function of the amount of impinging light. Thereafter the processor performs pixel thresholding and scene support (operations 74) on the corrected focal plane image. Pixel thresholding is an operation whereby pixel values below a certain threshold are treated as noise and set equal to zero. Scene support involves zeroing out of pixel values corresponding to points in the scene which one may wish to ignore. Then the metric of the forward model for the imager is updated with the pixel values of the new focal plane image (operation 76).

Still referring to FIG. 4, at the same time the processor also continually receives successive wavefront sensor images 80. Each wavefront sensor image 80 is corrected for pixel gain and offset (operations 82) to provide a more uniform image. Thereafter the processor performs pixel thresholding and scene support (operations 84) on the corrected wavefront sensor image. Then the metric of the forward model for the wavefront sensor is updated with the pixel values of the new wavefront sensor image (operation 76). Each new wavefront sensor image is broken up into a multiplicity of subaperture images.

The dashed rectangle in FIG. 4 represents the execution of the forward model. The processor 26 (see FIGS. 1 and 2) is programmed to perform a first least squares method that minimizes the sum of squared residuals with respect to forward models that model the response of the imager 18 and the response of the wavefront sensor 24. These forward models can run separately or be combined into one forward model. The forward model metrics are minimized to produce an updated point-spread function estimate (operation 78) and updated atmospheric phase volume estimate (operation 88). These processes may include: updating a three-dimensional atmospheric phase volume estimate based on images captured by the imager camera or subaperture images captured by the wavefront sensor camera; updating a point spread function estimate based on images captured by the imager camera or subaperture images captured by the wavefront sensor camera; and reconstructing an anisoplanatic image of the object using the updated point spread function and atmospheric phase volume estimates. (As is well known, the point spread function can be computed directly from the phase, and the recovered phase can be checked against its associated point spread function.) The objective is to adjust the parameters of the forward model to best fit the respective data sets. The least squares method finds its optimum when the sum of the squared residuals (hereinafter "the metric") is a minimum. (A "residual" is defined as the difference between a measured pixel value and a pixel value predicted by the forward model.) This non-linear problem is solved by iterative refinement. The point spread function updates and atmospheric phase updates are used to generate an updated image after each iteration (operation 90). Before the next iteration, adjustments are made as needed to the hardware (i.e., by applying tilt, focus and beamwalk diversity) under the control of the processor (operation 92). After each set of adjustments, additional images are acquired and processed until the non-linear minimization problem is solved, the result being an updated image having minimal atmospheric phase aberrations.

Other innovations of the imaging methods disclosed herein include: (a) estimation of the motion of the turbulence in layers that might be due to wind or other evolution of the turbulence, including a penalty function in the forward model for large winds or complex evolution; and (b) penalty functions in the forward model technique for turbulence that is not consistent with the expected turbulence statistics, e.g., penalties for turbulence estimates that do not obey Kolmogorov statistics.

The image reconstruction approach adopted herein makes joint use of image sequences produced by a conventional imaging channel and a Shack-Hartmann (lenslet) channel. Known iterative maximization techniques can be used to determine the reconstructed object that is most consistent with both the conventional and Shack-Hartmann raw pixel-level data.

Using wavefront sensors combined with focal-plane images to either sample tilt or sample objects seen through sub-regions of the pupil has several benefits, including reduced redundancy noise and reduced aberration content. Performance should be good out to $D/r_0=100$ (assuming about ten subapertures across the full aperture and reconstruction in each subaperture with $D/r_0 \approx 10$). The proposed approach should work well for large objects that move rapidly, for large apertures, and for extended or strong turbulence conditions (corresponding to low elevation angles).

The basic approach, as indicated in FIG. 1, is to measure the sum of phase tilts along multiple paths for each subaperture. The phase measurement $\delta\phi(i, j, m)$ at the $(i, j)$-th subaperture at time m can be written as $$\delta\phi(i,j,m)=\Sigma_k \delta\phi(i,j,k;m)+n(i,j,m) \quad (1)$$

where the sum is over the phase in each of $k=1, \ldots, K$ layers, and $n(i, j, m)$ is the corresponding measurement noise. For a Shack-Hartmann wavefront sensor, it is the tilts of the phase that are measured, $$\delta T(i,j,m)=\Sigma_k \delta T_L(i,j,k;m)+n(i,j,m), \quad (2)$$

where $\delta T(i,j,\underline{m})$ is the measured tilt and $\delta T_L(i,j,k; m)$ are the layer tilts that are to be estimated. An accumulation over $m=1, \ldots, M$ looks results in a large collection of equations in a limited number of unknowns $\delta T_L(i, j, k; m)$. Note that in $\delta T_L(i, j, k; m)$, indices i and j are implicitly a function of observation time m, so a gridding issue is present.

For objects in Earth orbit, the predominant motion is caused by the object; the impact of wind is secondary. Hence the ray paths are relatively well known over time, which should minimize the issue of gridding. The intersections of ray paths 28 and 30 seen in FIG. 1 (indicated by ellipses) represent overlapping volume cells, which allow solution of the corresponding individual phases that make up the path integrals.

One key added feature in the anisoplanatic imaging system disclosed herein is that the phases are estimated as part of (or separate from) the image reconstructions rather than as a part of AO wavefront reconstruction. The proposed image reconstructions typically involve collection of light onto both the focal plane of imager camera 18 and the focal plane of WFS camera 24.

Additional features of the anisoplanatic imaging system include the following. First, the phases can be estimated by a forward model technique such as multiframe blind deconvolution in each subaperture, which can allow larger subapertures. Second, the relative average phases of the subapertures are not known directly in a given frame. These unknown phase averages can be estimated by shifting the pupil image on the wavefront sensor, so that successive measurements see overlapping phase regions. This pupil image shift (which is an example of beamwalking) can be achieved using fast steering mirror 14. The effect of fast steering mirror 14 will displace the pupil image by an amount $\Delta z \Delta \theta$, where $\Delta \theta$ is the angular displacement placed on fast steering mirror 14 (neglecting effects of magnifications for simplicity), and $\Delta z$ is the path length of fast steering mirror 14 from the image plane of the pupil. The effect of fast steering mirror 14 will also cause a tilt that shifts the focal plane image position; this can be cancelled using fast steering mirror 12. Note that fast steering mirror 12 can also be used by itself to apply a tilt and therefore a focal plane image shift, but without a pupil image shift. The benefit of an image shift is that the image can be sampled at angular spacings finer than a pixel angular width. This can support super-resolution sampling of the subaperture images or in the full focal plane image. Lastly, focus (i.e., lenslet) diversity can be applied by moving the lenslet array 22 relative to the focal plane of WFS camera 24 (indicated by a double-headed arrow in FIG. 1); this focus diversity has been demonstrated to support anisoplanatic imaging (imaging over multiple isoplanatic patches) in past studies.

In accordance with the anisoplanatic imaging process disclosed herein, the image reconstruction process is augmented with the motion of two fast steering mirrors, and actuation of the image lens and the lenslet array. These shifts enable forward model estimation of the entire volume of phase aberrations in the atmosphere, with only slight motion of the object. This slight angular motion must satisfy $\delta\theta > d_{sub}/H$, where $d_{sub}$ is a subaperture width as mapped to the telescope pupil, and H is the height of the atmosphere. So for example with $d_{sub}=30$ cm and H=20 km, the required object motion is only about $\delta\theta > 15$ microradians in output space. To discern the lowest turbulent layer, which is typically within 1 km of the telescope, an object motion of about 300 microradians is needed. This can be achieved with about 5 seconds of data for sidereal object motion, and as quickly as 0.1 second for low LEO objects. Longer time histories can also be effective if signal-noise-ratio (SNR) is an issue. The relatively fast 0.1 second for LEO objects indicates significant smearing of phase information for typical frame rates of 100 Hz, so faster frame rates may be appropriate.

The shifts imposed by the two fast steering mirrors enable sub-pixel sampling of the object plane as well as sub-pixel sampling of the pupil plane, allowing estimation of finer features than would ordinarily be obtained with such pixels, or conversely, allowing larger pixels and subapertures than would ordinarily be needed to obtain a given resolution. This could benefit SNR.

The anisoplanatic imaging system proposed herein employs a forward model that uses as independent variables the tilts $\delta T_L(i,j,k;m)$ for the atmospheric phase (atmospheric optical path difference). The use of tilts rather than phase will improve the conditioning of the problem, since phase has an overall piston which is un-sensed and this will lead to a singular set of equations. The tilts are estimated within the forward model at the same time the image is reconstructed. The use of tilts, i.e., phase differences, is a natural choice for image reconstruction since the image point spread functions are also a function of phase differences (for each isoplanatic patch).

The 3-D grid used to represent the atmospheric volume could be coarse for faster reconstruction times. Alternatively, a finer 3-D grid could be used for more accurate reconstructions, but longer reconstruction times will result.

It is expected that the system proposed herein will be capable of imaging an angular region exceeding 100 microradians. At any given time sample, if one uses focus diversity, one can expect to achieve a compensated field of view (FOV) that is approximately equal to the overall FOV of the imaging system for uplooking scenarios in weaker turbulence. This FOV is about 100 microradians (this assumes a modern camera that is roughly 1000×1000, and assumes 100-nrad Nyquist sampling). For stronger turbulence, focus diversity by itself may be insufficient. In such cases the volume turbulence approach adopted herein will be helpful, and if a 300-microradian swath of data is obtained, it may be possible to image a region that large (300 microradians) in the along-track direction, and in the cross-track direction a width equal to the object width may be imageable (though large-FOV subapertures might be needed for very large objects).

The proposed approach should be able to estimate high-quality images that are much larger than the isoplanatic patch angle, 100 microradians or more in extent, and for $D/r_0$'s up to 100 or more. There are also potential benefits to SNR, since the signal from multiple frames is synthesized to produce an image. The images are expected to be of especially high quality if the super-resolution features of the forward-model are fully utilized to obtain super-resolution of both the image and the turbulence features. The approach is expected to be more robust than previously proposed approaches due to user-specified diversities in shift and focus of the image, rather than relying on the assumption that the turbulence is layered and moves with fixed velocities. Rather, this approach can test those assumptions when it creates volume estimates of turbulence.

In addition, the proposed approach would be able to provide improved phase estimates to improve the quality of laser light beams propagated through the atmosphere. Such adaptations would provide performance benefit, for example, to laser or optical communication systems seeking to establish links between source terminals on Earth and destination terminals on Earth-orbiting satellites. Improved anisoplanatic phase correction could also provide improved satellite illumination from the ground or aircraft for the purpose of active/laser imaging, providing optical power transfer or for laser weapons applications.

Finally, the proposed technique should be especially beneficial for imaging of objects in low-Earth orbit, for which object slew is much faster than local winds, wherein the assumption of discrete moving layers is of marginal relevance.

While systems and methods for anisoplanatic imaging of distant objects through the atmosphere have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit. These terms are also intended to include digital and analog devices that perform signal processing functions, taking one or multiple signals in, applying mathematical functions and filtering to the signals, and generating one or multiple output signals.

In addition, the method claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A method of anisoplanatic imaging of objects at long range through the atmosphere, said method comprising:
  (a) receiving light from a distant object at a pupil;
  (b) collecting respective portions of the received light toward an imager camera and a lenslet array of a wavefront sensor using diversity techniques to form successive focal plane images in the imager camera and successive wavefront sensor images in a camera of the wavefront sensor;
  (c) using a forward model technique to jointly update an atmospheric phase volume estimate for each wavefront sensor image and update a point spread function estimate;
  (d) reconstructing an image of the distant object based on the updated point spread function and atmospheric phase volume estimates; and
  (e) iteratively performing steps (a) through (d) until atmospheric phase aberrations in the reconstructed image are minimized,
  wherein the diversity techniques are controlled by a computer system, and processes (c) and (d) are performed by the computer system.

2. The method as recited in claim 1, wherein the diversity techniques comprise shifting an image of the pupil on the wavefront sensor camera.

3. The method as recited in claim 2, wherein the pupil image is shifted by moving the lenslet array in a direction perpendicular to an optical axis of the wavefront sensor camera.

4. The method as recited in claim 2, wherein the pupil image is shifted by steering one or more fast steering mirrors.

5. The method as recited in claim 1, wherein the diversity techniques comprise tilt diversity.

6. The method as recited in claim 1, wherein the diversity techniques comprise focus diversity.

7. The method as recited in claim 1, wherein each wavefront sensor image comprises a multiplicity of subaperture images, and step (c) comprises measuring a sum of tilts along multiple paths and estimating tilts for each layer of atmosphere.

8. The method as recited in claim 7, wherein step (c) further comprises estimating the motion of atmospheric turbulence in layers that might be due to wind or other evolution of the atmospheric turbulence, including a penalty function in the forward model technique for large winds or complex evolution.

9. The method as recited in claim 7, wherein the forward model technique comprises penalty functions for atmospheric turbulence that is not consistent with expected turbulence statistics.

10. A method of anisoplanatic imaging of objects at long range through the atmosphere, said method comprising:
(a) receiving light from a distant object through an aperture of a receiver sensor;
(b) splitting the received light into a first beam directed toward an imager camera and a second beam directed toward a lenslet array of a wavefront sensor;
(c) shifting an image of the pupil on the wavefront sensor;
(d) estimating atmospheric phase aberrations in a three-dimensional volume within a field of view of the receiver sensor for a multiplicity of subapertures for each image output by the wavefront sensor camera; and
(e) reconstructing an anisoplanatic image of the distant object using the estimated atmospheric phase aberrations,
wherein operation (c) is controlled by a computer system and processes (d) and (e) are performed by the computer system.

11. The method as recited in claim 10, further comprising measuring different overlapping light pipes in multiple directions, wherein process (d) comprises solving multiple independent equations for phases over turbulence layers to estimate the atmospheric phase aberrations in the three-dimensional volume such as by linear techniques or more generally by non-linear methods that may employ mathematical mechanisms for regularization of the solution and encouraging solutions that are consistent with a priori information, such as statistical expectations about the turbulence spatial structure and temporal dynamics.

12. The method as recited in claim 10, further comprising applying beamwalk diversity to cause overlap of subaperture images in successive images acquired by the wavefront sensor camera, wherein process (d) comprises stitching the subaperture images together using a forward model technique.

13. The method as recited in claim 12, further comprising applying focus diversity by moving the lenslet array along the optical axis of the wavefront sensor camera, wherein operation (e) comprises anisoplanatic reconstruction of each subaperture image.

14. The method as recited in claim 12, further comprising applying focus diversity by moving an imaging lens of the imager camera along the optical axis of the imager or more generally by adjusting elements of the imaging camera to change its focal length, wherein operation (d) comprises estimating the phase of a distant object extending over multiple isoplanatic patches.

15. The method as recited in claim 10, further comprising breaking up the aperture into a regular array of subapertures to form a multiplicity of subaperture images from the image output by the wavefront sensor camera.

16. A system for imaging of objects at long range through the atmosphere, comprising:
a receiver sensor comprising an aperture;
a first fast steering mirror located at a pupil plane and receiving light that has passed through said aperture;
a second fast steering mirror located at a distance from said pupil plane and receiving light reflected from said first fast steering mirror;
a beam splitter arranged to receive light reflected from said second fast steering mirror, said beam splitter splitting incoming light into first and second light beams;
a lenslet array arranged to receive said first light beam;
a wavefront sensor camera arranged to receive light that has passed through said lenslet array;
an imager camera arranged to receive said second light beam; and
a computer system programmed to perform the following operations:
(a) controlling actuation of said first and second fast steering mirrors and/or said lenslet array to cause a shift of a pupil image on the wavefront sensor camera;
(b) updating a three-dimensional atmospheric phase volume estimate based on images captured by said imager camera or subaperture images captured by said wavefront sensor camera;
(c) updating a point spread function estimate based on images captured by said imager camera or subaperture images captured by said wavefront sensor camera; and
(d) reconstructing an anisoplanatic image of the object using the updated point spread function and atmospheric phase volume estimates.

17. The system as recited in claim 16, wherein said computer system controls actuation of movement of said lenslet array in directions parallel and perpendicular to an optical axis of said wavefront sensor camera.

18. The system as recited in claim 16, wherein said computer system is further programmed to control actuation of said first and second fast steering mirrors to provide beamwalk diversity to cause overlap of the subaperture images in successive samples captured by the wavefront sensor camera, and operation (c) comprises stitching phase data together using a forward model technique.

19. The system as recited in claim 16, wherein operations (b) through (d) are iteratively performed using a forward model technique until atmospheric phase aberrations in the reconstructed image are minimized.

20. The system as recited in claim 19, wherein the forward model comprises penalty functions for atmospheric turbulence that is not consistent with expected turbulence statistics.

* * * * *